July 14, 1970    C. R. STEELE ET AL    3,520,166
APPARATUS FOR MAKING A CENTRIFUGAL BASKET
Original Filed April 15, 1964    3 Sheets-Sheet 3

INVENTORS.
Clarence R. Steele
Norval F. Allen
BY
McGrew & Edwards
ATTORNEYS

United States Patent Office 3,520,166
Patented July 14, 1970

3,520,166
APPARATUS FOR MAKING A CENTRIFUGAL BASKET
Clarence R. Steele, Denver, and Norval F. Allen, Wheatridge, Colo., assignors, by mesne assignments, to CF&I Engineers, Inc., Denver, Colo., a corporation of Colorado
Original application Apr. 15, 1964, Ser. No. 359,979. Divided and this application Feb. 3, 1967, Ser. No. 613,898
Int. Cl. B21d 5/14
U.S. Cl. 72—175
6 Claims

ABSTRACT OF THE DISCLOSURE

Apparatus for forming centrifugal basket walls wherein a flattened wire is formed into a continuously spiraling conical shape by an arrangement of rollers.

---

This is a division of application Ser. No. 359,979, filed Apr. 15, 1964, now abandoned.

This invention relates to continuous centrifugal apparatus and particularly to apparatus for making centrifugal basket walls.

Centrifugals or centrifuge machine utilize centrifugal force for separating one type of material from another type, for example, solids from liquids. In general, a centrifugal utilizes a rapidly rotating perforated cage or basket into which the material to be separated is placed. Such machines may be of the batch process type or the continuous type. In one form of continuous centrifugals, an inverted conical shaped basket is rapidly rotated so that the liquid is forced through a pervious membrane mounted internally of the conical basket and the partially dry solids are gardually forced up along the basket and out over the top into a separate container.

Centrifugal machines utilize centrifugal force for the separation of materials and the rotating baskets must be strong enough to accommodate the substantial pressures involved. As pointed out above, a pervious membrane is utilized to separate liquids from solids, and such pervious membranes are not sufficiently strong to be self supporting under the operating pressures of the centrifugal machine. Therefore, common practice heretofore has been to provide a basket made of heavy gauge, perforated metal plate formed in the shape of a conical basket for supporting a pervious membrane internally of the basket. The pervious membrane may be wire screen, cloth or the like. In some industries, the practice requires the use of expensive materials for at least the exposed parts of the centrifugal and particularly the basket and material contacting parts, for example, stainless steel for the sugar industry. The forming of the baskets from metal plate as heretofore encountered in the art results in an expensive operation with a substantial waste of material.

According to the present invention, we have provided apparatus for making a centrifugal basket of high strength which is easily formed of flat wire without a waste of material. The invention provides a machine for forming the wire into a conical shape for a centrifugal basket wall.

Included among the objects and advantages of the present invention is the making of a centrifugal basket wall of simplified design and increased strength which is formed of a spiral of continuous flat wire wound into conical form and arranged to support a perforate membrane internally thereof.

Another object of the invention is to provide apparatus for forming a centrifugal basket wall from a continuous band of wire.

A still further object of the invention is to provide for the making of a centrifugal basket wall of a novel design which permits a simple and fast fabrication from a continuous length of a spirally conically wound wire.

These and other objects and advantages of the invention may be readily ascertained by referring to the following description and appended illustrations in which.

Figure 1:
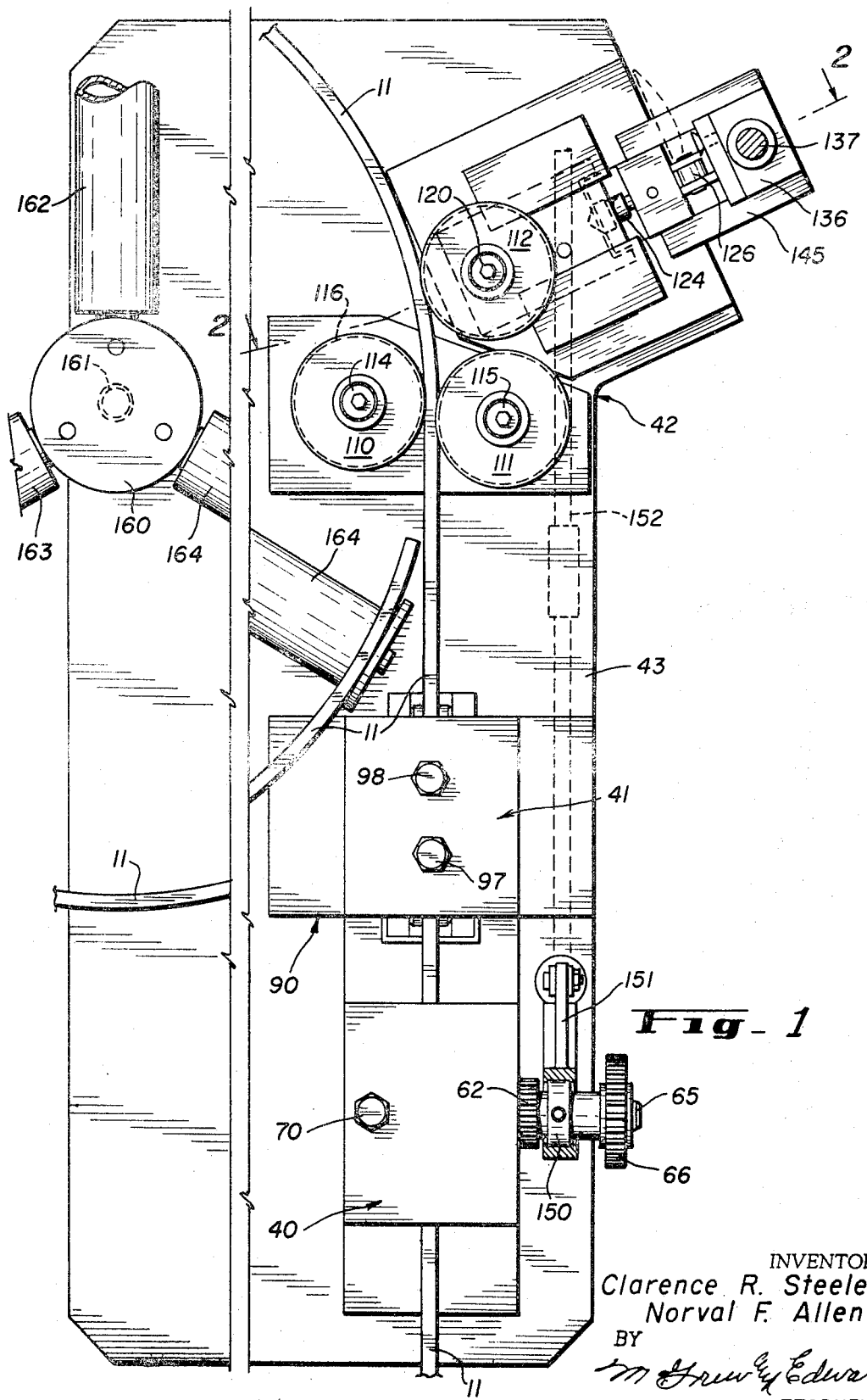
FIG. 1 is a top plan view of a wire forming device for the centrifugal basket wall according to the invention.
Figure 2:
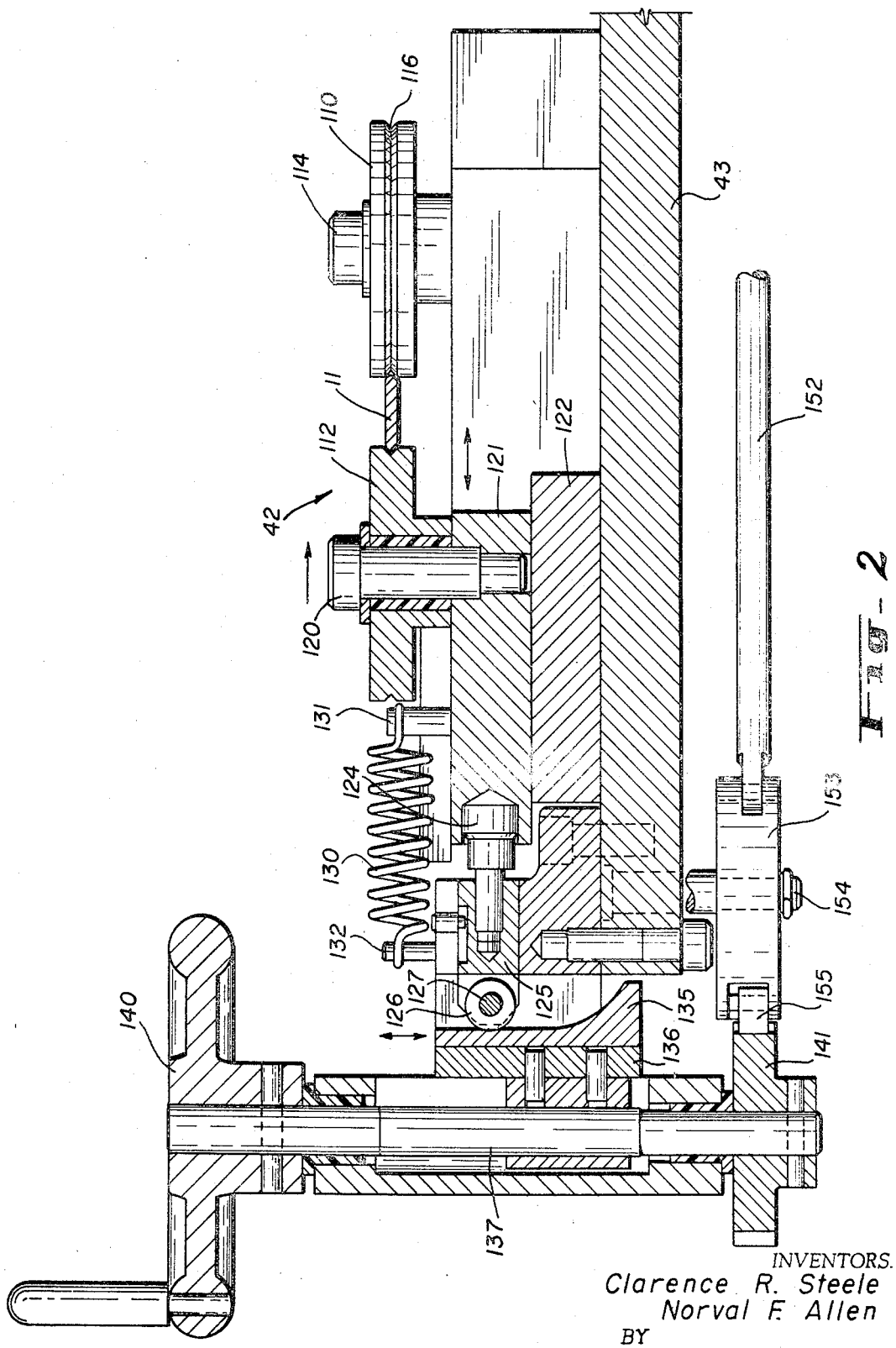
FIG. 2 is a cross sectional view of a control mechanism for the wire forming device of FIG. 1.

Two general types of centrifugal baskets are shown in FIGS. 1 and 2 of the above referred to parent application, a shrouded basket in FIG. 1 and an unshrouded basket in FIG. 2. Each of the baskets consists of a spiral of contiuous wire in the shape of a conical member. The difference between the two is in the supporting members. With the shrouded type, a sheet or plate material encompasses the exterior of the basket secured to the brace members and in itself acts as bracing to produce the amount of support required for the basket. The shrouded type has an attached material separating partition, while the unshrouded type requires similar arrangement in the centrifugal housing. In each case the wire is a round edged flat wire preferably of oblong section which is curved on the width and is spirally wound in such a manner as to form the conical shape.

Figure 4:
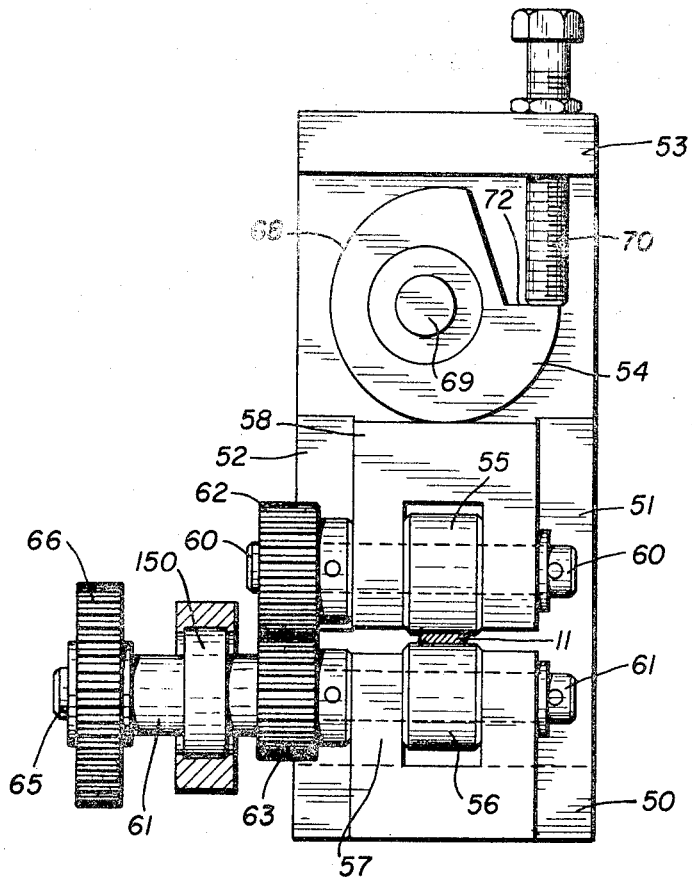
FIG. 4 is a front elevation of a wire device mechanism for forcing wire through the forming mechanism.

The wire for making the basket is shown in cross section in FIG. 4, and it is generally a flat wire having a flat upper side and a lower side with two rounded ends. The wire is made of stainless steel for certain application, and in one application the annealed stainless stell is $5/16$ inch wide by 0.080 inch thick with round edges. The wire is normally coiled on rolls flatwise for convenience. One size of basket has the wire wound in conical shape of about $8\frac{1}{4}$ inches for the bottom and about 28 inches at the top and has about forty loops of the wire spaced about .33 inch apart. Such a basket requires about 227 feet of the wire.

For preparing the wire into a basket form the wire must first of all be straightened from curves acquired while in the roll. The wire is bent into a straight member and then curved sideways in increasing diameter coils to form a conical member. As shown in FIG. 1 a length of wire 11 issues from a roll (not shown) into a drive member 40, through a straightening member shown in general by numeral 41, and subsequently into the coiling mechanism shown in general by numeral 42.

The driving roll assembly 40 is shown in FIG. 4 wherein a framework includes a base 50 and upright sides 51 and 52. A top support member 53 supports a cam 54. A pair of rollers 55 and 56 is journaled in blocks 57 and 58 on shafts 60 and 61, respectively. The two shafts are rotated together for the driving operation by means of gearing 62 and 63 on shafts 60 and 61, respectively. The shaft 61 has an extension member 65 on which is mounted a gear 66 for connection to drive means, not shown, turning the shafts and the rollers 55 and 56. The blocks 57 and 58 are arranged to move vertically so that the rollers carried therein may be moved toward and away from one another. The cam 54 includes a cam surface 68 and the cam is mounted on a shaft 69. Rotating the cam clockwise causes it to press the block 58 toward the block 57. An adjusting bolt 70 mounted in the head 53 is arranged to press against cam surface 72 rotating the cam so as to force it against the block 58 to provide pressure on the wire 11 carried therein. The rollers grip the wire and rotating the rollers drives the wire toward the straightening blocks.

Figure 3:
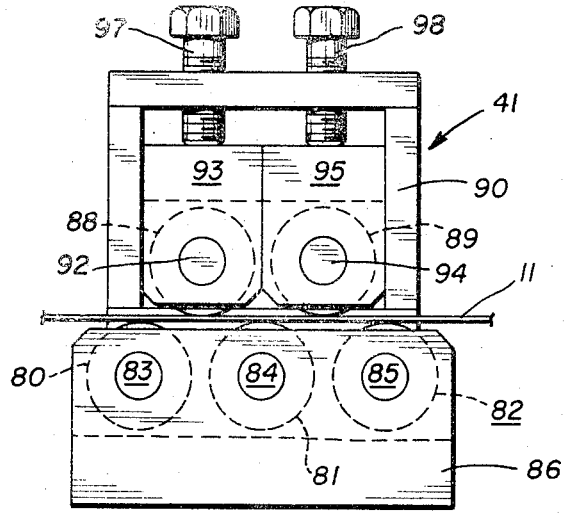
FIG. 3 is a side elevation of a wire straightening device for use in the wire forming apparatus.

The wire, after leaving the drive rollers 40, shown in FIG. 1, is pushed through straightening rollers shown in general by numeral 41. The straightening rollers include, as shown in FIG. 3, a series of three lower rollers 80, 81 and 82 mounted on shafts 83, 84 and 85, respectively, mounted in a lower frame 86. A pair of upper rollers 88 and 89 are mounted in upper frame 90 in the bight between the lower rollers. The roller 8 is mounted on shaft 92 which is journaled in a reciprocal block 93, and the roller 89 is journaled on a shaft 94 which is mounted in a block 95. The blocks 93 and 95 are controlled, respectively, by set screws 97 and 98 which control the pressure of the rollers 88 and 89 on the ribbon 11 between the lower and upper rollers. By adjusting the pressure on one or the other of the upper rollers, the partially curved wire may be straightened for passing through the spiral helix former.

The helix forming rollers shown in general by 42 in FIGS. 1 and 2 include three rollers 110, 111 and 112. The rollers 110 and 111 are essentially fixed relative to one another. Roller 112 may be at a slightly higher elevation than the other two rollers to space the formed loops of wire. The roller 110 is journaled on shaft 114 and the roller 111 is journaled on shaft 115 and rotate as wire 11 is driven between them. The shafts are mounted on base 43. All of the rollers are grooved and have the configuration of that shown in FIG. 2 for roller 110 wherein a groove 116 extends peripherally midway of the width of the roller therearound. The rollers 110 and 111 are fixedly mounted on the base 43 but may be adjustable to accommodate the particular size of wire being drawn through them. The roller 112 is an adjustable roller which is arranged to move generally toward and away from the rollers 110 and 111 at an angle to the bight between them. The helical wire basket wall is formed by pushing the wire 11 through the spiraling rollers 110, 111 and 112 and progressively forcing the roller 112 toward the roller 111 to decrease the radius of the arc of the curved wire being forced therethrough. This progressively forms smaller turns forming the conical shaped wire basket.

The roller 112 is journaled on a shaft 120 which is mounted in a reciprocal black 121 which is arranged to move as indicated by the arrow, FIG. 2. The block 121 slides on support 122 which is mounted on base 43. The block 121 is secured to one end of connecting rod 124 and the other end of the rod is secured to a cam follower support 125. A cam follower 126 is journaled on shaft 127 mounted on the cam follower support 125. A spring 130 is mounted at one end on a post 131 which is fixedly secured to the block 121 and by the other end to post 132 which is fixedly mounted in the frame secured to the table to bias the block 121 toward the cam surface. A cam 135 is mounted on a vertically movable block 136 which is threadedly mounted on a threaded shaft 137. At the upper end of the shaft a hand wheel 140 provides means for manually setting the cam, and at the other end by a gear or cog 141. Obviously, rotation of the shaft 137 moves the cam upwardly and downwardly since the block 136 is held securely against rotation in the frame 145.

An eccentric 150 mounted on the shaft 61, FIG. 1, drives a push rod 151 which is connected to push rod extension 152. The push rod extension is connected with a pivoted lever arm 153 pivoted on pivot 154. A pawl 155 mounted on the other end of the pivot arm 153 contacts the cog 141 for moving the same and periodically rotating the shaft 137. The gearing and the eccentric are arranged so that the cam 135 is moved upwardly to move the cam follower from an outer position to an inner position along the cam surface during the forming of the helix. The cam travels the length of the cam surface during the time the required length of the wire passes through the forming rollers.

A wire support assembly is provided for the spiraled wire coming from the forming rollers 110, 111 and 112, and this includes a central disc 160 mounted on a shaft 161 which is mounted on the frame 43 in position to support the wire coming from the forming rollers mounted thereon. Rotatable extending tubular arms 162, 163 and 164 are spacedly mounted on the disc 160 and are arranged to support the wire coming from the forming rollers.

The wire coming from the forming rollers is a helical shaped coil of wire which is of conical configuration, with the approximate shape of the desired basket. Since the loops are free, they are obviously not in exact relationships as necessary for forming the final basket. A simplified welding fixture is provided for holding the wire in position for welding the side supports thereon, for holding the top and bottom plates, and for holding the support rings where necessary as is described in the above referred to parent application.

While the invention has been illustrated by reference to specific devices, there is no intent to limit the spirit or scope of the invention to the precise details so set forth except as defined in the following claims.

We claim:

1. Apparatus for forming a continuous wire from a roll into a conical centrifugal basket wall comprising a set of straightening rollers arranged for removing from said wire the bend acquired by rolling it in said roll, a pair of juxtaposed rollers arranged to receive wire from said straightening rollers and to pass said wire therebetween, a third roller mounted on the wire emerging side of said pair of rollers in position to contact one side of said wire and force it generally toward a first of said pair of rollers to bend the wire passing therethrough, means for progressively moving said third roller in relation to said first roller as the wire is fed therethrough to progressively change the radius of curvature of bend of said wire, and a pair of juxtaposed drive rollers arranged to grip the wire leaving said roll and to drive said wire through said staringtening rollers and said pair of rollers.

2. Apparatus for forming a continuous flat wire from a roll into a conical centrifugal basket wall comprising a set of straightening rollers arranged for removing from said wire the bend acquired by rolling it in said roll, a pair of grooved juxtaposed rollers arranged to receive wire from said straightening rollers and to pass said wire therebetween, a third grooved roller mounted on the wire emerging side of said pair of rollers in position to contact one side of said flat wire and force it generally toward a first of said pair of rollers to bend said wire laterally of its width, means for progressively moving said third roller toward said first roller as the wire is fed therethrough to progressively decrease the radius of curvature of bend of said wire, and a pair of juxtaposed drive rollers arranged to grip the wire leaving said roll and to drive said wire through said straihgtening rollers and said bending rollers.

3. Apparatus for forming a wire of oblong section into a conical centrifugal basket wall comprising a pair of juxtaposed rollers arranged to support and pass a continuous wire strand therebetween, bending means mounted on the wire emerging side of said pair of rollers in position to contact one side of said wire and force it generally toward a first of said pair of rollers to bend said wire passing between said pair of rollers laterally of its width, and means for progressively moving said bending means in relation to said first roller as wire is fed therebetween to progressively change the radius of curvature of the bend in said wire.

4. Apparatus for forming a continuous wire of oblong section from a roll into a conical centrifugal basket wall comprising straightening means arranged for removing from said wire the bend acquired by rolling it in said roll, guide means arranged to receive wire from said straightening means and to pass said wire therefrom, a roller mounted on the wire emerging side of said guide means in position to contact one side of said wire and force it generally toward said guide means to bend said wire laterally of its width, means for progressively moving said third roller toward said guide means as the wire is fed therethrough to progressively decrease the radius of curvature of bend of said wire, and drive means arranged to grip the wire leaving said roll and to drive said wire through said straightening means and said roller.

5. Apparatus for forming a continuous wire of oblong section from a roll into a conical centrifugal basket wall comprising a set of straightening rollers arranged for removing from said wire the bend acquired by rolling it in said roll, a pair of grooved adjoining rollers disposed in spaced relationship and having parallel axis of rotation and arranged to receive wire from said straightening rollers and to pass said wire therebetween a third grooved roller mounted on the wire emerging side of said pair of rollers in position to contact one side of said wire and force said third roller toward a first of said pair of rollers to bend said wire laterally of its width to form a helical coil, a pair of juxtaposed drive rollers arranged to grip the wire leaving said roll and to drive said wire through said straightening rollers and said pair of rollers, and means inclusive of a cam and cam follower movably interconnected between said third roller and said drive rollers for progressively moving said third roller toward said first roller in relation to the movement of said drive rollers.

6. Apparatus for forming wire into a conical centrifugal basket wall comprising a pair of juxtaposed rollers arranged to support and pass a continuous wire strand therebetween, a third roller mounted on the wire emerging side of said pair of rollers in position to contact one side of said wire and force it generally toward a first of said pair of rollers to bend said wire passing between said rollers, means for feeding wire through said rollers, and means for progressively moving said third roller in relation to said first roller as wire is fed therebetween, said means for progressively moving said third roller coordinated with said feed means so as to change the radius of curvature of the wire in direct relation to the amount of wire passing through said rollers.

References Cited
UNITED STATES PATENTS

| | | | |
|---|---|---|---|
| 928,073 | 7/1909 | Schneider | 72—171 |
| 928,220 | 7/1909 | Schneider | 72—171 |
| 2,918,103 | 12/1959 | Washabaugh | 72—175 |

CHARLES W. LANHAM, Primary Examiner

G. P. CROSBY, Assistant Examiner